UNITED STATES PATENT OFFICE.

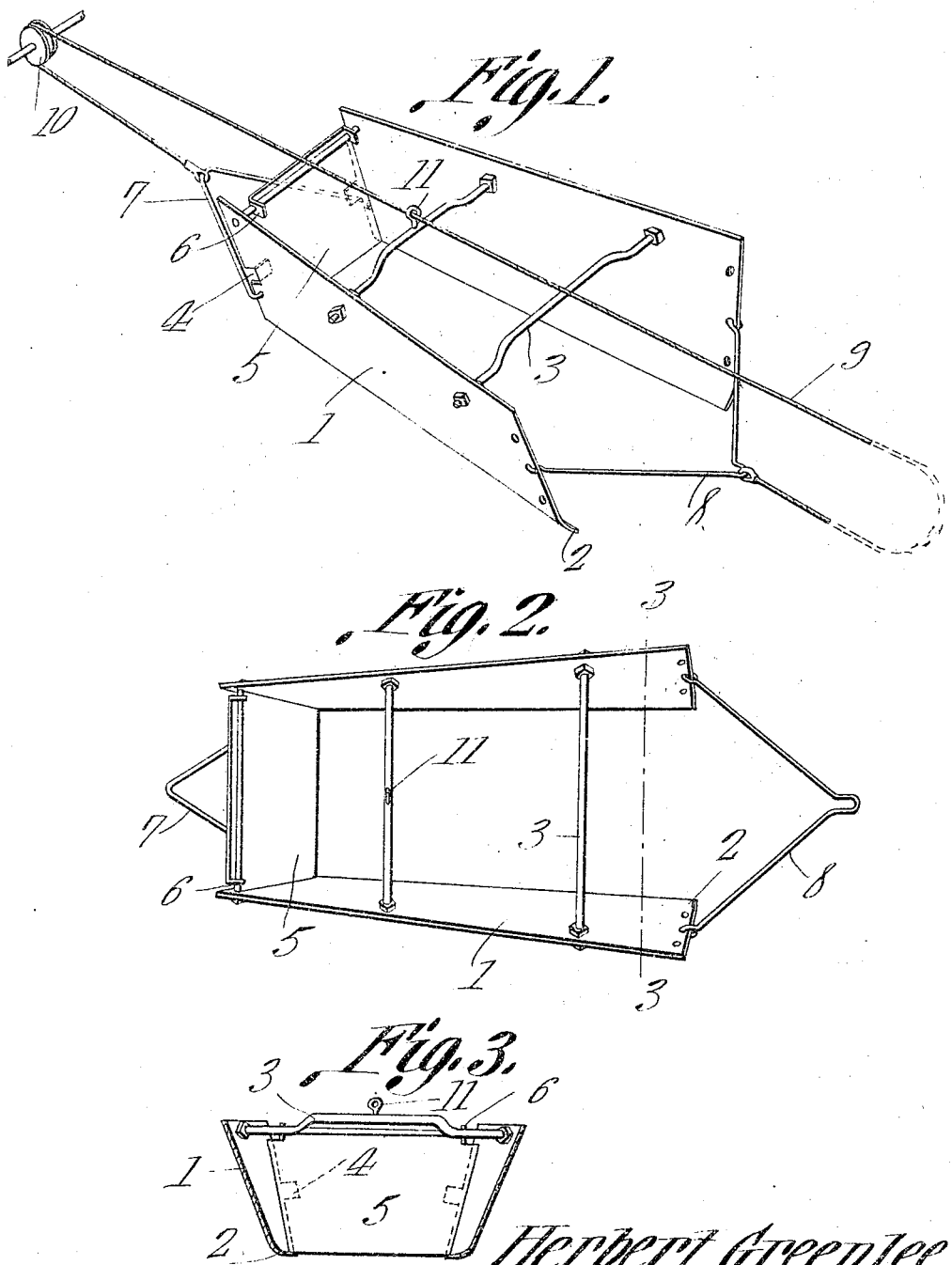

HERBERT GREENLEE, OF CHITWOOD, MISSOURI.

GRAVEL-SCRAPER.

1,000,258.

Specification of Letters Patent.   Patented Aug. 8, 1911.

Application filed November 3, 1910.  Serial No. 590,488.

*To all whom it may concern:*

Be it known that I, HERBERT GREENLEE, a citizen of the United States, residing at Chitwood, in the county of Jasper and State of Missouri, have invented a new and useful Gravel-Scraper, of which the following is a specification.

This invention has relation to scrapers especially adapted to be used for moving gravel and similar material and it consists in the novel construction and arrangement of its parts as hereinafter shown and described.

The object of the invention is to provide a scraper of the character indicated especially adapted to be used at a pit for removing material from the same. After the scraper has been relieved of the material means are provided for returning the same to the pit for reloading.

With this object in view the structure is especially adapted for the purpose indicated and consists of side pieces held togther by cross bars and inclined toward each other at their lower ends. The lower edge portions of the said side pieces are inwardly curved and the rear ends of said side pieces converge toward each other. A gate is hingedly mounted at the rear ends of the said side pieces and when closed is in an inclined position with its lower edge portion foremost. The said gate when swung to an open position moves at its lower portion toward the forward ends of the side pieces. A draft bail is pivotally located at the rear ends of the side pieces and a draft bail is adjustably connected with the forward ends of the said side pieces. A draft cable is connected with the said draft bails and any suitable means may be provided for operating the cable.

In the accompanying drawing: Figure 1 is a perspective view of the gravel scraper. Fig. 2 is a top plan view of the same. Fig. 3 is a transverse sectional view of the same cut on the line 3—3 of Fig. 2.

The gravel scraper includes side pieces 1 which are inclined toward each other at their lower portions and the lower edge portions of the said side pieces are inwardly curved as at 2. The said side pieces 1 toward their rear ends converge toward each other and the said side pieces are rigidly held in this relation by means of cross bars 3. Tongues 4 are cut from the material composing the side pieces 1 at the rear ends thereof and are inwardly turned as indicated in Fig. 1 of the drawing. The said tongues are adapted to serve as stops for a gate 5 which is hingedly mounted upon the rearmost cross bar 3 of the series. The said gate 5 is provided at its upper edge portion with lugs 6 which are cut from the material constituting the gate and forwardly bent and it is through the said lugs that the said rearmost cross bar 3 passes. The ends of the side pieces 1 which are closer together are termed the rear ends and a bail 7 is pivotally connected with the said rear ends of the side pieces. A bail 8 is pivotally and adjustably connected with the forward end portions of the said side pieces 1. A draft cable 9 is connected at one end with the bail 7 and in practice is strained around a pulley 10 which is journaled upon a suitable fixed support. The intermediate portion of the said cable 9 is passed through an eye 11 mounted upon one of the cross bars 3 and the forward end of the said cable 9 is attached to the forward bail 8. Any suitable means may be provided for drawing the said cable 9.

In operation when it is desired to load the scraper the draft strain is applied to that end portion of the cable 9 which is attached to the draft bail 8 and the said scraper is moved along the bottom of a pit of gravel or similar material. The gravel is collected between the side pieces 1 and the gate 5. The scraper is moved in the direction as indicated until it arrives at the point of delivery. The draft strain is then applied to the scraper through that end portion of the cable 9 which is attached to the draft bail 7 and the said scraper is moved back into the gravel pit. By reason of the fact that the rear end portions of the side pieces 1 converge toward each other and the lower edge portions of the side pieces are inwardly turned the said scraper will ride over the material in the pit without moving the same to any considerable extent. This rearward movement on the part of the scraper is also facilitated by reason of the fact that the side pieces 1 are inclined toward each other at their lower edge portions. Also when the scraper is moving in a backward direction as indicated, the gate 5 is free to swing in an upward direction and pass over the material at the bottom of the pit. When however, the scraper is moved in a forward direction, the curved edge portions 2 serve as means for cutting into the gravel and the said gravel is accumulated between the inclined side pieces 1 and against the forward surface of the gate 5 which is closed against the stops 4. Therefore it will be seen that the structural arrangement of the scraper is such that when it is moving in a forward direction in a gravel pit the parts have a tendency to cut into and accumulate the material when as the said scraper is moving in a rearward direction along the bottom of the pit the parts are so arranged as to have a tendency to escape or pass over the material without unnecessarily disturbing or moving the same. By adjustably connecting the draft bail 8 with the forward ends of the side pieces 1 the scraper may be made to cut into the material deep or shallow as desired.

Having described the invention what is claimed is:

A scraper comprising two side pieces converging toward each other at their rear ends and toward each other at their lower portions and their lower edges being curved inward toward each other, the bodies of said pieces being otherwise plane; means for rigidly connecting the upper edges of said side pieces, a gate hingedly mounted between the upper edges of said side pieces at the smaller end of the scraper and adapted to swing inward between them, stops for preventing it from swinging outward, and draft mechanism at both ends of the scraper.

In testimony that I claim the foregoing as my own, I have hereto affixed my signature in the presence of two witnesses.

HERBERT GREENLEE.

Witnesses:
W. A. CRISTY,
ELLIS ATKINSON.